United States Patent [19]

Dunn, Jr.

[11] Patent Number: 5,430,332
[45] Date of Patent: Jul. 4, 1995

[54] MOVABLE AND ADJUSTABLE DAM

[76] Inventor: E. D. Dunn, Jr., Greenfield Plantation Rte. 1, Box 122, Morgan, Ga. 31766

[21] Appl. No.: 203,323

[22] Filed: Feb. 28, 1994

[51] Int. Cl.$^6$ .................. F03B 15/02; F03B 15/14
[52] U.S. Cl. .................. 290/54; 290/43; 415/3.1; 415/152.1; 415/153.1
[58] Field of Search .............. 290/43, 54; 405/75, 405/80; 415/3.1, 152.1, 153.1, 202

[56] References Cited

U.S. PATENT DOCUMENTS

| | | | |
|---|---|---|---|
| 3,816 | 11/1844 | Ross | 415/3.1 |
| 118,840 | 9/1871 | Briggs et al. | 415/152.1 |
| 410,132 | 8/1889 | Witherell | 415/3.1 |
| 873,845 | 12/1907 | Crow | 405/75 |
| 1,441,955 | 1/1923 | Walker | 415/3.1 |
| 4,270,056 | 5/1981 | Wright | 290/54 |
| 4,973,856 | 11/1990 | Loreto | 290/54 |

*Primary Examiner*—A. D. Pellinen
*Assistant Examiner*—Robert Lloyd Hoover
*Attorney, Agent, or Firm*—Jones & Askew

[57] ABSTRACT

A movable and adjustable dam including a waterwheel for generating power in rivers, creeks, streams and other flowing bodies of water in which the use of a permanent dam would be impractical or undesirable. The preferred dam includes floatable wall members that can be anchored in position in a body of water to form a water channel there between. The wall members can be unanchored when it is desirable to move the dam. The dam also includes a water wheel mounted between the wall members. The water wheel generates power as it is rotated by water flowing through the channel. Further, the preferred dam includes an adjustable floor comprising a combination of interconnected plates mounted between the wall members. The combination of interconnected plates may be raised or lowered to control the level and flow of water in the water channel and to allow the water wheel to generate power in a mode that is most efficient in response to available water quantity and flow.

28 Claims, 9 Drawing Sheets

(OVERSHOT)

(LOW BREAST)

(UNDERSHOT)

MOVABLE AND ADJUSTABLE DAM

TECHNICAL FIELD

The present invention relates to an apparatus for generating power in an environmentally sound manner. More particularly, the present invention relates to a movable dam and water wheel assembly that is adjustable to generate power from a flowing body of water in a manner most efficient relative to available water quantity and flow.

BACKGROUND OF THE INVENTION

It has been known for thousands of years that there is a tremendous amount of power in a flowing body of water such as a river or even a small stream or creek. This power often manifests itself in a destructive manner, as is evident during periods of heavy rain and flooding. However, when a flowing body of water is properly controlled, this power can be utilized in a beneficial manner.

In determining the most effective way to utilize the power in a flowing body of water in a beneficial manner, a crucial problem exists: how does one utilize this power in an economical and practical way? In finding a solution to this problem, three variables become important: (1) the volume of water available; (2) the velocity, or current, of the water; and (3) the difference in elevation between the high and low points in the body of water, commonly known as the head. These three variables are important from a power production standpoint because the velocity of the water represents the kinetic energy of the water, while the volume of the water available, in combination with the head of the water, represents the potential energy of the water. By increasing the velocity of the water, the kinetic energy of the water is increased. By increasing the volume of the water available and/or the head of the water, the potential energy of the water is increased.

A large-scale permanent dam is a structure capable of increasing the value of all three variables. This type of dam increases both the volume of water available and the head of the water by impeding the normal downstream path of the flowing water and increasing the level of the water on the upstream side of the dam. Subsequently, as the volume of water flows under pressure through to the power generating turbines typically associated with such a dam, the kinetic energy of the water increases due to the increase in velocity of the water.

In addition to producing power, a large-scale permanent dam also produces effects on the surrounding geographical area, both economically and environmentally. Economically, a large scale dam, such as the Hoover Dam or one of the many dams built by the Tennessee Valley Authority, is capable of satisfying the energy needs of an entire town or city. A large-scale dam also stimulates local economies by creating construction and energy related jobs. Environmentally, this type of dam reshapes the surrounding landscape by controlling seasonal flooding and by often providing otherwise dry, arid regions with a constant and abundant supply of water.

A large-scale permanent dam also has associated drawbacks, both economically and environmentally. Economically, this type of dam is costly because large tracts of low lying land upstream from this dam must be bought before being flooded. Also, large amounts of concrete, steel and other costly materials must be used in the construction of the dam. Land downstream from the dam may suffer due to the regulated water supply, especially during extremely dry periods. Further, maintenance of these often mammoth structures is costly. Environmentally, dams often upset the "natural order" of the surrounding region. For example, migratory species of fish such as salmon often are permanently incapable of returning to their spawning beds once a permanent dam is built to impede a river. Prime wildlife habitat is often lost as the land upstream from the dam is flooded.

In many cases, these aforementioned drawbacks are overcome by economies of scale. Through government funding and construction by such entities as the Army Corps of Engineers, the benefits associated with a large scale dam more often than not outweigh the drawbacks.

However, many farmers, landowners and other individuals often have a need to produce power from a flowing body of water on a much smaller scale and without the capability of overcoming the aforementioned economic and environmental drawbacks through economies of scale. The specific power needs of these individuals are small enough so that a large scale permanent dam is not needed or is not desired. Thus, the need exists for a structure capable of generating power on a smaller scale without the associated economic and environmental drawbacks associated with a large scale permanent dam.

To fulfill this need, smaller semi-permanent dams have been built that utilize water wheels for generating power from a flowing body of water. These dams utilize water wheels in place of the turbines associated with the large scale permanent dams. The water wheels are especially useful for producing power in smaller moving bodies of water that would otherwise not be utilized as power sources due to the small size of the bodies of water.

A water wheel mounted on one of these smaller dams generates power as flowing water rotates the wheel. A wheel is typically comprised of several spokes emanating from a center axis. Troughs are located on the outer circumference of the wheel to cause the wheel to come into operative contact with moving water. The wheel is mounted on an axle which is attached to a dam at a location that enables flowing water to rotate the wheel and thus generate power. This flowing water can rotate the wheel in one of two ways. First, water falls, due to the force of gravity, onto the troughs of the wheel, causing the wheel to rotate about its center axis. Second, water having a strong current rotates the wheel as the water flows into contact with the troughs and underneath the bottom of the wheel. In both ways, the rotating wheel may power a generator or other power generating or power consuming machinery.

There are three common prior art water wheel designs. The three designs are the overshot, the undershot and the breast wheel designs (see FIGS. 1A–1C). Each of the three designs is most efficient in a particular water level or at a particular water velocity. With the overshot design, the water level is allowed to build up behind the dam to the top of the wheel. Once water reaches the top of the wheel, it flows over the top of the wheel, coming into contact with the troughs of the wheel and causing the wheel to rotate in a clockwise direction (see FIG. 1A). With the wheel of the undershot design, water flows under the wheel at a level high enough for the flowing water to engage the troughs of the wheel and rotate the wheel from the bottom in a counterclockwise direction (see FIG. 1C). With a water wheel of the breast wheel design, the dam impedes water until the water reaches a level intermediate the top and bottom of the water wheel. A water wheel of the breast wheel design is rotated in a counterclockwise direction by a combination of the downstream velocity of the water and the gravitational effect of the water falling from a high upstream point to a low downstream point (see FIG. 1B).

Consequently, the water wheels of the overshot and breast wheel designs are the most efficient in a moving body of water having little velocity or low volume. In these designs, a dam impedes the water, thus raising the level of the water and increasing the head and potential energy of the water. As the water is released over the dam, the potential energy turns into kinetic energy, which in turn is transferred to the water wheel.

The water wheel of the undershot design is most efficient when the velocity of the water is high. If the water is impeded as in the overshot design, flooding can possibly occur due to the already existing high water volume. Similarly, the head of the water need not be increased when the water velocity is high. Power is more efficiently produced from the fast moving water as the water flows through the underside of, and into moving contact with, the troughs on the outer circumference of the water wheel.

Others have utilized certain of these water wheel designs in combination with small scale dams to produce power from flowing bodies of water.

Crow, U.S. Pat. No. 873,845, discloses a portable dam that develops power by utilizing the force or energy of a stream. A diversion assembly comprised of pontoons and vertical rods is positioned to dam a stream. This assembly is placed across the stream to divert a portion or substantially all of the water to one of the shores where it is passed through a raceway. Waterwheels of the undershot design are positioned within this raceway at the downstream end thereof to generate power from the current of the stream. Thus, this movable dam must work outside of the physical boundaries of the river bank in order to be effective.

Wright, U.S. Pat. No. 4,270,056, discloses an undershot current motor wherein a horizontal drive shaft is mounted on floats moored or anchored in moving water. The drive shaft has at least two sets of three-bladed paddle assemblies. The blades generate power through contact with the moving water. The invention also includes a pulley and counterweight system for raising and lowering the floats of the system during changes in the elevation of the water. This undershot wheel design is entirely dependent upon existing water level.

Loreto, U.S. Pat. No. 4,973,856, discloses a hydroelectric generator system that uses a breast wheel design. In this system, water from a stream enters an inflow structure that is placed in the stream. The inflow structure includes lateral walls, overflow openings for discharging excess water when the water level is high, and a step located between the lateral walls that gives the runner breast wheel characteristics. The device specifically defines a runner with blades. The water flows downwardly through an inflow opening in order to produce rotation of the runner. The step cooperates with the runner to effect operation of the breast wheels. The runner is rotatably positioned on a shaft downstream from the step between the two lateral walls. Water flows downwardly through an inflow opening in the step and produces rotation of the runner due to the weight of the water that is accumulated in spaces between the blades of the runner.

Certain drawbacks exist with these aforementioned water wheels. Water wheels are often used in smaller rivers and streams that typically experience significant fluctuation in water level due to various factors often linked to the geographical surroundings. This fluctuation in water level is particularly common in certain areas of the country. For example, in the Midwest United States, land is often left barren for months at a time after crops are harvested. This barren land, having little or no vegetation, can only absorb a limited amount of water during periods of heavy rain. Similarly, in the Southeastern and Pacific Northwest regions of the United States, land that has been deforested by companies in the paper industry can only absorb a limited amount of water during heavy rain. Thus, the smaller rivers and streams running through these areas often exhibit significant fluctuation in water levels due to the tremendous amount of runoff water flowing into the rivers and streams during periods of heavy rain. Conventional water wheels lack the capability of being adjusted to maximize the efficiency of the wheel in response to these changing water levels. The water wheels discussed in Crow and Loreto, for example, are specifically designed for use in a particular stream at a particular location with a specific water level. This leaves little room for adaptability to conform to changing conditions. Power is not necessarily efficiently generated from moving water by such rigidly designed structures.

Also, the system discussed in Wright may be adjustable as a whole to adapt to changes in water level. However, the water wheel itself is not adjustable; the entire platform on which the wheel is mounted must be moved upwardly or downwardly as water supply varies, thus maintaining the wheel in an undershot mode. While the platform is able to provide vertical movement of the wheel, the assembly is not readily moved from its initial location.

While these devices address many of the needs for production of energy on smaller streams and rivers, the devices do not provide flexibility in adapting to changing water conditions. Stated more particularly, there is a need in the art for a dam and waterwheel structure that is capable of being moved from one location to another and that is adjustable among overshot, breast and undershot modes of operation to produce power at maximum efficiency in response to available water quantity and flow.

SUMMARY OF THE INVENTION

The present invention addresses the above-described needs in the prior art by providing a dam and water wheel configuration that is capable of being moved from one location to another and that is adjustable among overshot, breast and undershot modes of operation to produce power at maximum efficiency in response to available water quantity and flow. The present invention is constructed so that one may easily disengage the dam of the present invention and move it upstream or downstream to another desired location. The dam of the present invention is also constructed so that one may easily disassemble the dam into several parts for transportation to a different stream, creek, or river, as power needs may require. Further, the present invention is designed so that the dam restricts water flow in variable fashion to maximize the power generating capacity of the water wheel mounted to the dam. A movable and adjustable dam constructed in accordance with the present invention is adjustable in a manner that allows one to manipulate the upstream water level in a quick and easy manner. Further, a movable and adjustable dam constructed in accordance with the present invention also provides one with the power-generating capabilities often provided by a permanent dam, albeit on a smaller scale, without the economic and environmental drawbacks of a permanent dam.

Generally described, the present invention comprises two wall members, a water wheel rotatably mounted between the two wall members and an adjustable dam floor slidably attached between the wall members. The wall members are spaced apart from each other so as to define a channel such that a flowing body of water passes or flows therethrough. The wall members thus direct water flow. The rotatable water wheel is driven by water flowing through the channel. The dam floor is adjustable to control the water level in the channel on the upstream side of the water wheel to maximize the power-generating efficiency of the water wheel.

Described more particularly, a preferred embodiment of the present invention comprises an adjustable dam floor with at least four plates: a draft plate mounted between the wall members, a penstock plate mounted to the draft plate, an inlet plate slidably attached to the penstock plate and an outlet plate hinged to the draft plate. Each of these plates is preferably adjustable. The draft and penstock plates are adjustable to control the level of the water on the upstream side of the water wheel. The outlet plate is adjustable so as to use the current of the flowing body of water to aid in adjusting the draft and penstock plate from an upward position to a downward position. The dam floor is adjustable to allow the water wheel to function in an undershot, breast, or overshot mode, depending on the quantity of water available and the velocity of the water.

The inlet plate extends downwardly and rests against the bed of the flowing body of water when the water wheel is adjusted to function in either a breast mode or an overshot mode. Alternatively, the inlet plate extends substantially horizontally underneath the surface of the water channel when the water wheel is adjusted to function in an undershot mode.

The wall members are preferably hollow. These wall members can thus be filled with rocks, metal weights, water or other objects of sufficient weight to secure the wall members in place in the flowing body of water. Alternatively, the wall members can be anchored to the bed of the body of water or can be secured to stationary objects such as trees, boulders, or posts on the banks of the flowing body of water.

The wall members of the dam each further include an outer wall, a deflection upstream wall, an inner wall and a downstream beveled wall. The inner walls each define grooves in which the flexible draft plate is slidably mounted.

The water wheel placed between the wall members preferably has a flanged outer periphery to effectively engage the flowing water, so that the flowing water drives the water wheel in an effective manner. If the volume and velocity of the flowing water is sufficiently high for effective power generation, the adjustable dam floor is placed in a substantially horizontal position such that water flows directly through the channel formed by the wall members to engage the lowest portions of the water wheel. The water wheel then functions as an undershot wheel to generate power. On the other hand, if the volume and velocity of the flowing water are diminished, the floor may be adjusted so as to raise the head of the water flow. The water wheel then functions as a mid (or low) breast wheel or an overshot wheel, which is more efficient in terms of power generation.

In a second preferred embodiment, the present invention comprises a plurality of pairs of wall members, a plurality of water wheels rotatably mounted between the pairs of wall members, and an adjustable dam floor mounted between each of the pairs of wall members. Each wall member has an upstream end, a downstream end, an inner wall, and an outer wall. The outer wall members are secured, but the remaining wall members may float in the water. The pairs of wall members thus form a plurality of channels, each of which includes a water wheel. The upstream ends of the wall members are angled to direct the body of water into the multiple channels. The water wheels are each driven by the flowing water in the channels. Further, the adjustable dam floors each comprise a flexible draft plate slidably mounted between respective wall members, a penstock plate mounted to the draft plate, and a downstream plate hinged to the draft plate. Each of the penstock and draft plates is adjustable to control the level of the water on the upstream side of the water wheel. The outlet plates are upwardly adjustable to use the current of the flowing body of water to adjust the penstock and draft plates from an upward position to a downward position. The dam floors are each independently adjustable to maximize the power-generating capacity of the water wheels.

The wall members of the dam in the second embodiment are hollow. The outer wall members of this second preferred embodiment are designed to be filled with rocks, metal weights, cement, water or other weighted objects to secure the outer wall members in place in the flowing body of water. Alternatively, the outer wall members can be anchored to the bed of the flowing body of water to secure the wall members in place. The outer wall members can also be secured to stationary objects such as trees, boulders, or posts on the banks of the flowing body of water to secure the wall members in place. The remaining wall members are retained in place by means of the water wheel mountings there between.

Thus, it is an object of the present invention to provide an improved movable and adjustable dam.

It is a further object of the present invention to provide a movable and adjustable dam with an adjustable water wheel that is relatively easily assembled and disassembled for transportation.

It is a further object of the present invention to provide a movable and adjustable dam with a water wheel that is adjustable among undershot, breast, and overshot modes of operation.

It is a further object of the present invention to provide a movable and adjustable dam with a water wheel that is adjustable to generate power in a manner most efficient with respect to water quantity and flow velocity.

It is a further object of the present invention to provide a movable and adjustable dam with an adjustable power-generating water wheel for use in creeks, streams, rivers and other bodies of water.

It is a further object of the present invention to provide a movable and adjustable dam with an adjustable power-generating water wheel for use in creeks, streams and other smaller bodies of water in which the construction of a permanent dam would be impractical or undesirable.

It is a further object of the present invention to provide a movable and adjustable dam that can be readily transferred from one place to another for use.

It is a further object of the present invention to provide a movable and adjustable dam that can be expanded to the size of different streams, rivers or other flowing bodies of water.

It is a further object of the present invention to provide a movable and adjustable dam that is responsive to extreme fluctuation in water quantity and flow velocity.

It is a further object of the present invention to provide a movable and adjustable dam which can control a flowing body of water so as to protect land in the general vicinity of the flowing body of water from the adverse effects of significant fluctuations in water level.

It is a further object of the present invention to provide a movable and adjustable dam which can control the fluctuation level of a flowing body of water in a manner that pays for itself through the generation of power.

It is a still further object of the present invention to provide a movable and adjustable dam that avoids the difficulties and limitations typically associated with large, fixed dam structures.

These and other objects and features of the present invention will become apparent from a reading of the following detailed description of the preferred embodiments taken in conjunction with the appended drawing figures.

DETAILED DESCRIPTION OF THE INVENTION

Figure 1A:
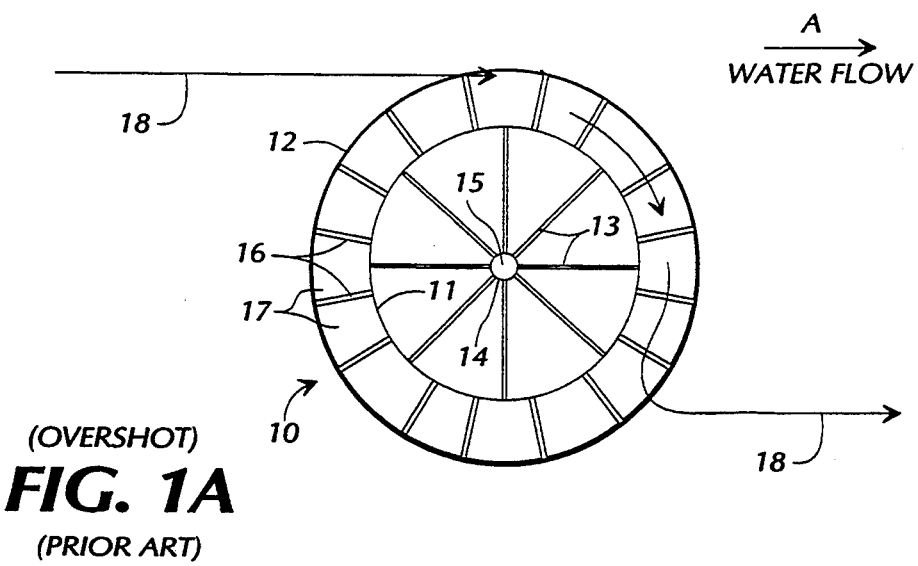
FIG. 1A is a cross-sectional side view of a water wheel illustrating the overshot mode of operation.

Turning next in detail to the drawing figures, in which like numerals reference like parts throughout the figures, the preferred embodiments of the present invention will now be described.

Figure 1B:
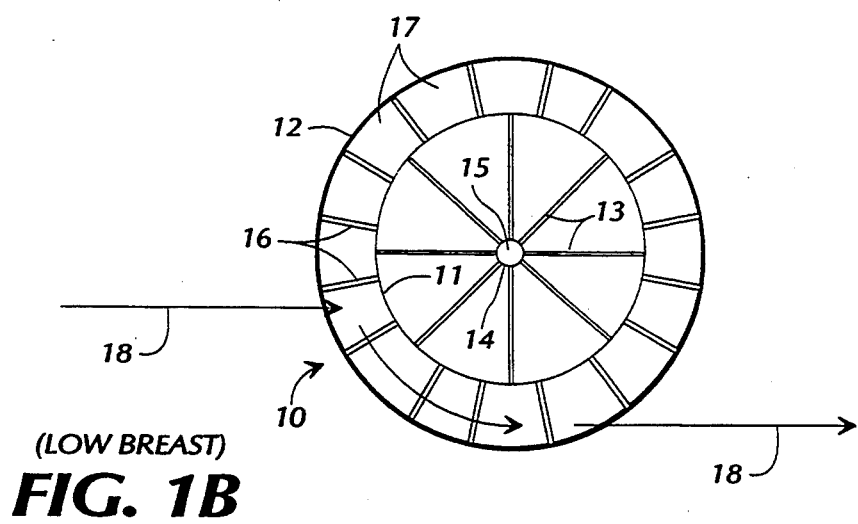
FIG. 1B is a cross-sectional side view of a water wheel illustrating the breast mode of operation.
Figure 1C:
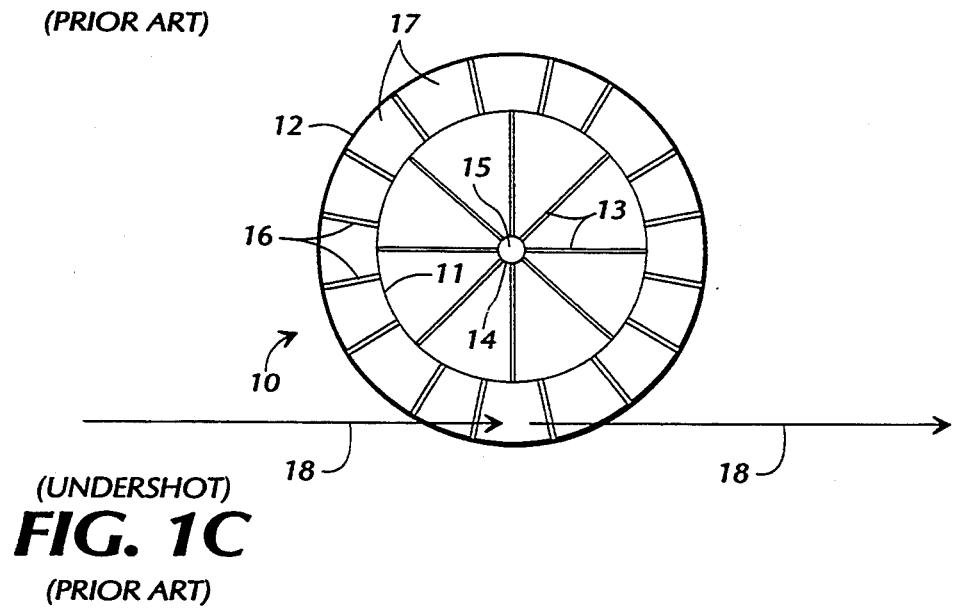
FIG. 1C is a cross-sectional side view of a water wheel illustrating the undershot mode of operation.

FIGS. 1A, 1B and 1C are cross-sectional side views of a water wheel illustrating three modes of water wheel operation that are known in the art. FIG. 1A illustrates an overshot mode of operation. FIG. 1B illustrates a breast wheel mode of operation. FIG. 1C illustrates an undershot mode of operation. In each of these drawing figures, the water wheel is indicated generally at 10. The water wheel 10 includes an inner frame member 11 and two outer frame members 12 flanking each side of the inner frame member 11. (Only the far outer frame member is shown in the cross-sectional views of FIGS. 1A–1C. The other outer member has been removed to enable the reader to view the water wheel as described below.) A plurality of spokes 13 is attached at one end to a wheel hub 14, which is mounted to a wheel axle 15. The plurality of spokes 13 is attached at the other end to the inner frame member 11, thus providing structural support to the water wheel 10. Flanges 16 are attached to the inner frame member 11 and extend across from one outer member to the other, thus forming a series of troughs 17 between the inner frame member 11 and the outer frame members 12. Those of ordinary skill in the art will appreciate that there are many variations of water wheel designs that are known in the art. Thus, the foregoing description is for illustrative purposes and does not limit the scope of the present invention.

A flowing body of water is schematically represented by arrow 18. The direction of the arrow indicates the water's direction of flow. As water 18 flows in a downstream direction, indicated by arrow A, it drives the wheel, rotating it and the axle 15 in a direction and in a manner that will be described in greater detail below. The water wheel 10 is preferably composed of a durable lightweight material such as aluminum or plastic to facilitate ease of rotation by the flowing water. It should be appreciated that, although the aforementioned water wheel is preferable for use in the present invention, the water wheel may be of any design suitable to convert the motion of flowing water to the rotating motion of a shaft, axle or the like. In FIG. 1A, the flowing water 18 causes rotation of the wheel 10 in a clockwise rotation. In both FIGS. 1B and 1C, the flowing water causes counterclockwise rotation of the wheel 10. Either rotational direction is appropriate for practice of the present invention and may be switched from a clockwise rotation as shown in FIG. 1A to a counterclockwise rotation as shown in FIGS. 1B and 1C, or vice versa, through control of a baffle (not shown) or any other type of rotation control device well known to those skilled in the art.

Figure 2:
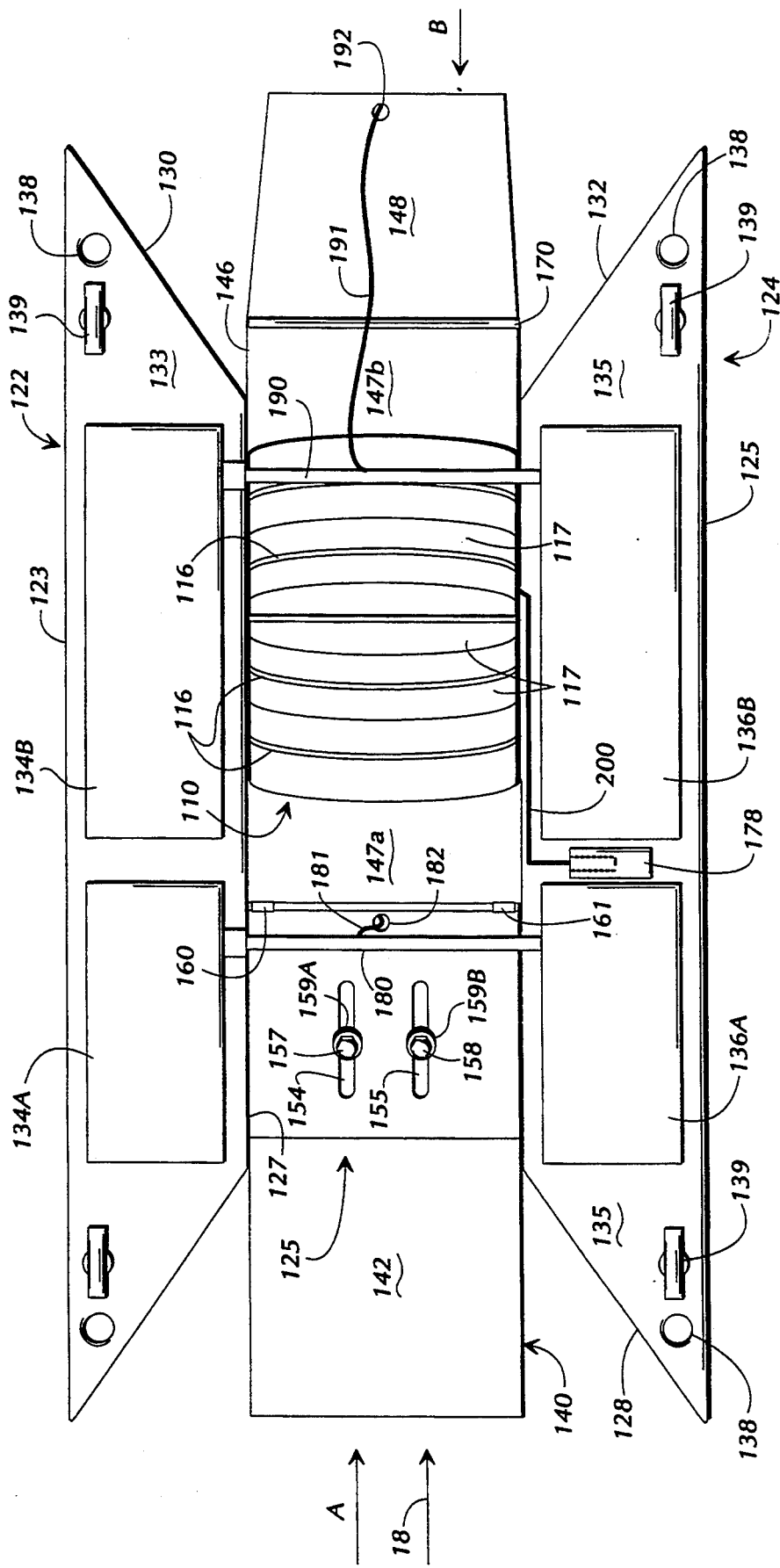
FIG. 2 is a top plan view of a preferred embodiment of a movable and adjustable dam assembly according to the present invention.
Figure 3:
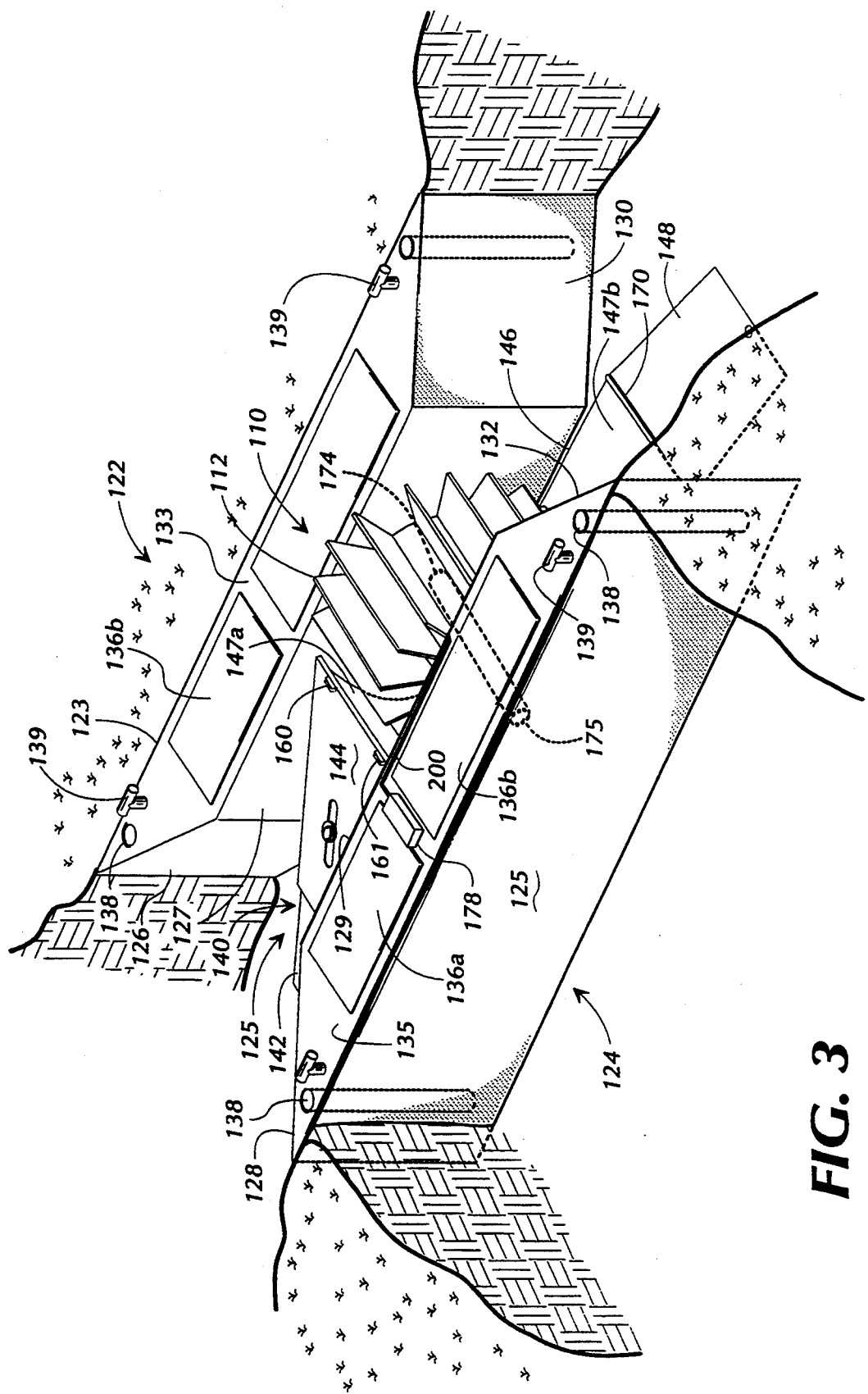
FIG. 3 is a perspective view of the preferred embodiment shown in FIG. 2 shown in a breast mode of operation.

A preferred embodiment of the present invention is shown in FIGS. 2 and 3. An adjustable and movable dam constructed in accordance with the present invention is identified generally at 100. The dam 100 includes a water wheel 110.

As best seen in FIGS. 6–9, the water wheel 110 includes an inner frame member 111 and two outer frame members 112 flanking each side of the inner frame member (as in FIGS. 1A–1C, only the far outer member is shown in these cross-sectional views). A plurality of spokes 113 are attached at one end to a wheel hub 114, which is mounted to a wheel axle 115. The plurality of spokes 113 are attached at their other ends to the inner frame member 111. The spokes thus provide framework support to the water wheel. Flanges 116 are attached to the inner frame member 111 and extend across from one outer member 112 to the other, thus forming a series of troughs 117 between the inner frame member and the outer frame members.

The water wheel 110 is rotatably mounted between two wall members 122 and 124. As described in greater detail hereinbelow, a flowing body of water 18 passes between and is directed by the wall members 122 and 124 to engage the water wheel 110.

The wall members 122 and 124 are preferably hollow and constructed of any suitable waterproof material, such as fiberglass, ferrocement, wood, aluminum or steel, although many other durable waterproof materials are also suitable. The wall members 122 and 124 must be constructed of a material that is sufficiently durable to withstand constant and prolonged exposure to the flowing water 18 as well as other environmental elements, such as extreme temperatures, sunlight, and the like.

The wall members 122 and 124 are mirrored reflections one of the other. The wall member 122 comprises an outer wall 123, a deflection upstream wall 126, an inner wall 127 and a downstream beveled outlet wall 130. The wall member 124 comprises an outer wall 125, a deflection upstream wall 128, an inner wall 129 and a downstream beveled wall 132. The wall members 122 and 124 each include top surfaces 133 and 135, respectively. The top surface 133 of the wall member 122 is fitted with two doors 134a and 134b that provide access to the interior of the wall member 122. The top surface 135 of the wall member 124 is fitted with two doors 136a and 136b that similarly provide access to the interior of the wall member 124. The doors 134a, 134b, 136a and 136b may be hinged to their respective top surfaces 133 and 135 to facilitate opening and closing thereof. The wall members 122 and 124 each include floor surfaces 137 and 141 (not shown), respectively. Thus, it will be understood that each wall member 122 and 124 is a hollow structure, the interior of which is readily accessible by means of the doors 134a, 134b, 136a and 136b.

The wall members 122 and 124 are generally trapezoidal in cross-sectional shape (see FIG. 2). The upstream walls 126 and 128 are angled to direct water 18 flowing in the downstream direction into a channel 125 defined by the opposing inner sides 127 and 129 of the respective wall members 122 and 124. The water 18 in this channel, after driving the water wheel 110 in a fashion described in more detail below, flows out of the channel through the opening defined by the beveled outlet walls 130 and 132. It will be appreciated that, although the wall members 122 and 124 are of a trapezoidal shape, they may also be of a substantially rectangular shape, ellipsoidal shape or any other functional shape that allows wall members 122 and 124 to define a water channel there between in which the water wheel 110 can be mounted.

In a preferred embodiment, the wall members 122 and 124 are preferably 8 feet in depth, as measured from their respective top surfaces 133 and 135 to their respective floor surfaces 137 and 141. In this same preferred embodiment, the wall members 122 and 124 are 2 to 3 feet in width, as measured from the respective inner sides 127 and 129 to the respective outer sides 123 and 125. It should be appreciated that these dimensions can be varied in accordance with the varied needs of a particular user while still maintaining the adaptability of the dam 100 to a wide variety of dimensions and depths of various flowing bodies of water.

Each wall member 122 and 124 contains slotted guides 138 that extend vertically from the top surfaces 133 and 135 through the floor surfaces 137 and 141. These guides 138 are designed to receive posts, rods or other securing means for reasons and in a manner set forth in detail below. Bits or cleats 139 are bolted or otherwise fastened or secured to the top surfaces 133 and 135 of the respective wall members 122 and 124. These bits or cleats 139 may be of any suitable design, including typical cleats or bits provided to secure boats to dock moorings with the aid of ropes, cables or chains.

Wall member 124 supports a generator 178. The generator 178, along with the water wheel 110, converts mechanical power into electrical power in a manner described in more detail below.

Figure 4:
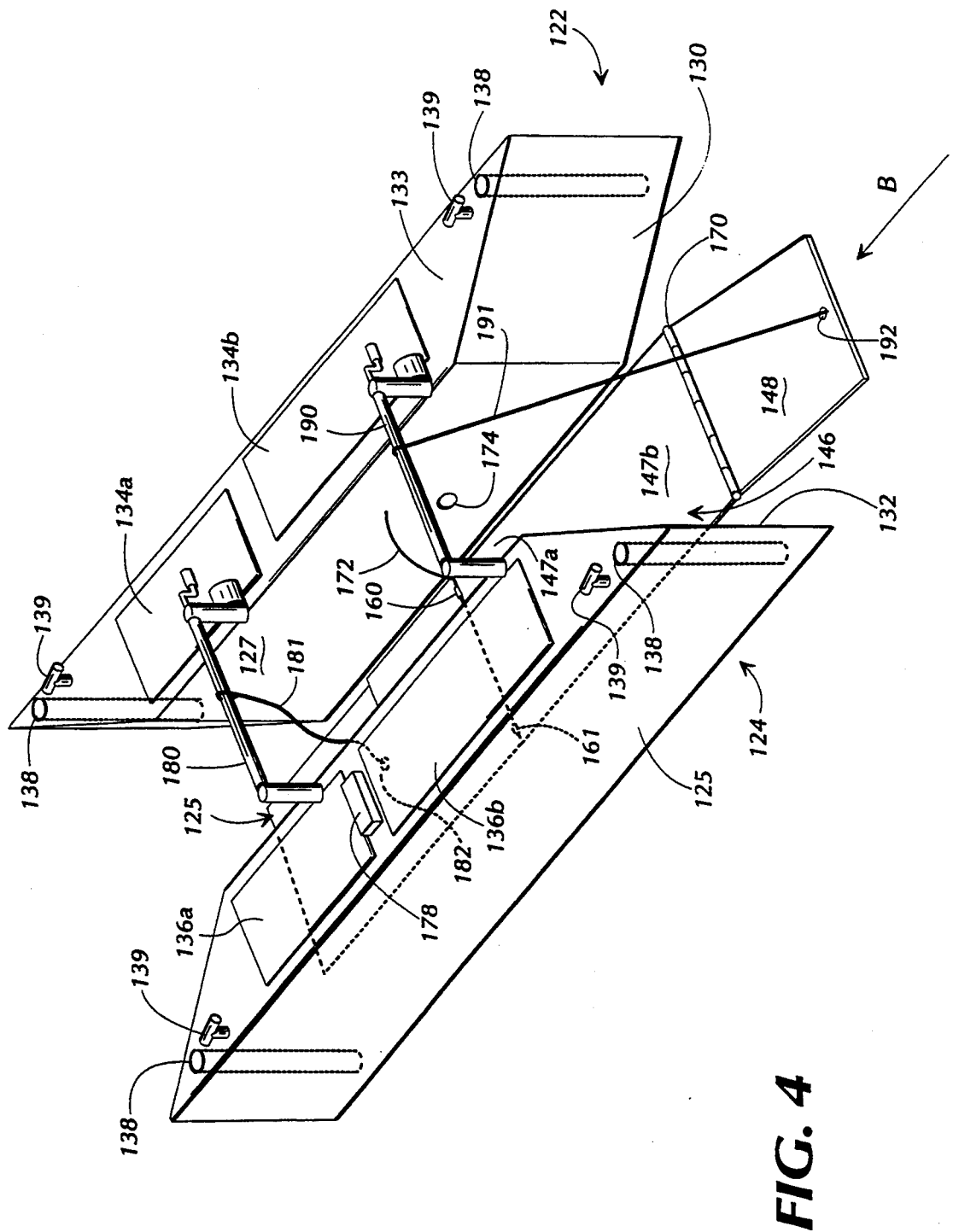
FIG. 4 is a front perspective view of the preferred embodiment shown in FIG. 2 shown with the water wheel removed and showing the draft plate and outlet plate in an undershot operational mode.
Figure 5:
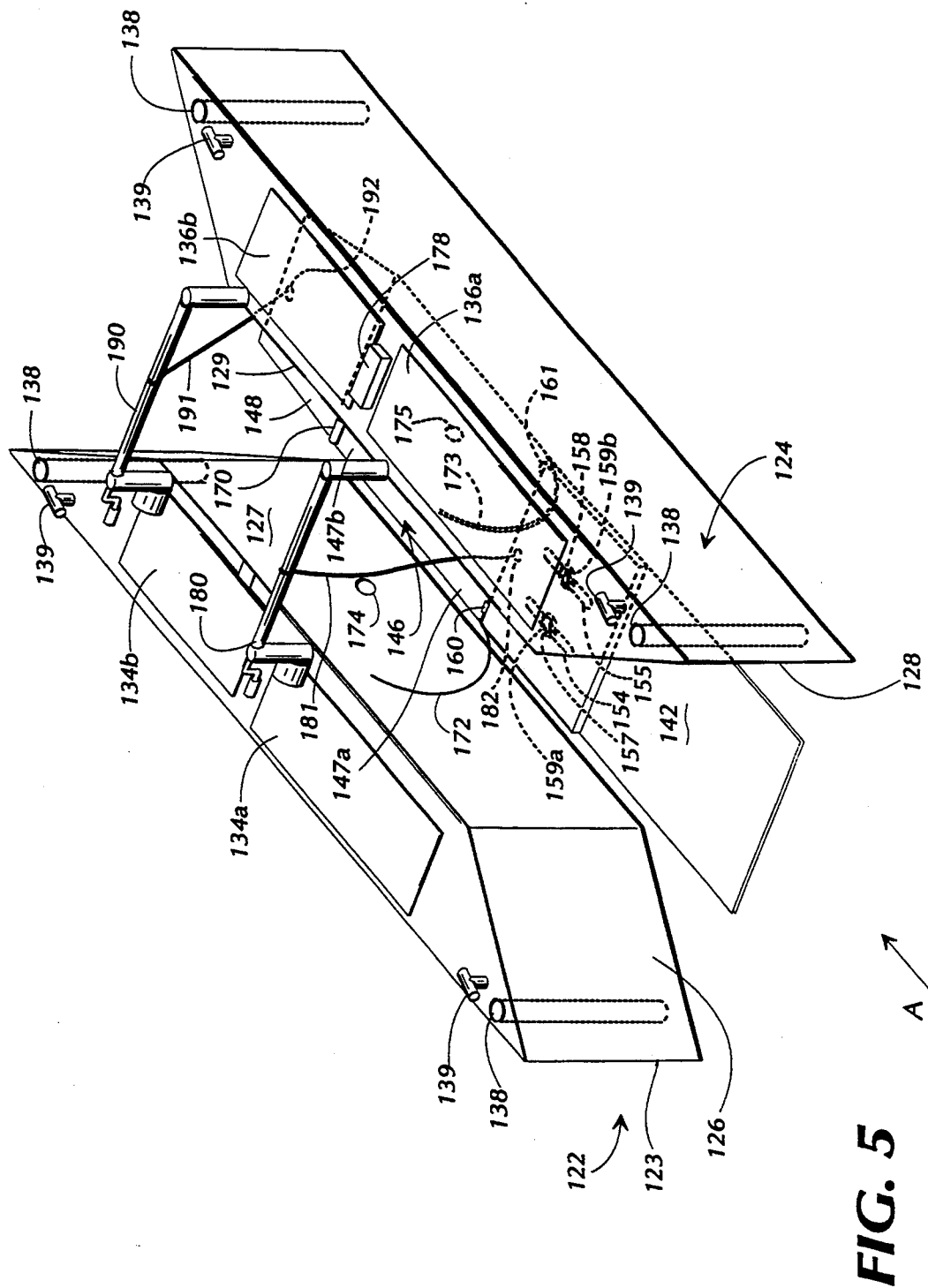
FIG. 5 is a rear perspective view of the preferred embodiment shown in FIG. 2 shown with the water wheel removed and showing the draft, inlet and penstock plates in an undershot mode of operation.

The inner sides 127 and 129 of the respective wall members 122 and 124 are fitted with axle bearings 174 and 175, respectively (see FIGS. 4 and 5). The axle 115 of the water wheel 110 is placed within the hub 114 of the water wheel and subsequently into these bearings 174 and 175. The axle 115 is thus mounted into the axle bearings 174 and 175 to be suspended between the two wall members 122 and 124. It is to be understood that the water wheel 110, while preferably mounted in the aforementioned manner, can also be mounted to the wall members 122 and 124 in numerous other ways. For example, the axle bearings 174 and 175 may be mounted on top of the wall members 122 and 124 in mounting brackets (not shown) to receive the axle 115 of the water wheel 110 if the water wheel is relatively large in diameter.

The inner sides 127 and 129 define respective grooves 172 and 173 (see FIGS. 4 and 5). As described below in greater detail, the grooves 172 and 173 receive and direct an adjustable dam floor 140 that, when manipulated as described herein, alters the flow of water 18 through the dam 100 so as to convert the water wheel 110 from overshot or breast to undershot operation or vice versa. More specifically, the grooves 172 and 173 receive and direct a portion of the adjustable dam floor 140 in order to obtain the maximum power generation depending upon the quantity and velocity of water flow 18.

The preferred adjustable dam floor 140 includes an inlet plate 142, a penstock plate 144, a flexible draft plate 146 and an outlet plate 148. It is to be understood that the plates 142, 144, 146 and 148, in combination, define the adjustable dam floor 140 and cooperate to effect conversion of the dam 100 from overshot to undershot, overshot to breast, or breast to undershot modes of operation.

The inlet plate 142 may be made of any suitable material of sufficient strength and durability to withstand the force imparted by the flowing water 18, such as water-treated wood, fiberglass, plastic or any type of metal, such as aluminum. The inlet plate 142, in combination with the deflection upstream wall 126 of wall member 122 and deflection upstream wall 128 of wall member 124, directs water 18 toward the water wheel 110. Inlet plate 142 traverses the distance between the wall members 122 and 124 so as to insure that the maximum volume of water 18 is directed to the water wheel 110. Inlet plate 142 defines two holes 153a and 153b (the hole 153b is shown in the cross-sectional views in FIGS. 6–9, while the hole 153a is hidden from view behind 153b), which facilitate adjustment of the plate as described below.

The penstock plate 144 is located immediately downstream of the inlet plate 142. The penstock plate 144 may also be made of any suitable material of sufficient strength and durability to withstand the force of the flowing water 18, such as water-treated wood, fiberglass, plastic or any type of metal. The penstock plate 144 directs the water 18 to the water wheel 110. The head of the water depends entirely on the position of the penstock plate 144 and the inlet plate 142. The penstock plate 144 is secured to the inlet plate 142 in the following manner. The penstock plate 144 defines two grooves 154 and 155 (see FIGS. 2 and 5) that are aligned with holes 153a and 153b defined in the inlet plate 142. Bolt 157 is inserted through the groove 154 and into the hole 153a aligned with the groove 154. Similarly, bolt 158 is inserted through the groove 155 and into the hole 153b aligned with the groove 155. Bolts 157 and 158 receive cooperating nuts 159a and 159b to slidably secure the inlet plate 142 to the penstock plate 144. By virtue of the bolts 157 and 158, the holes 153a and 153b, and the grooves 154 and 155, the relative positions of the inlet plate 142 and the penstock plate 144 may be adjusted so as to lengthen or shorten the floor 140.

The flexible draft plate 146 is located immediately downstream of the penstock plate 144. The draft plate 146 extends between the wall members 122 and 124. More specifically, the draft plate 146 rests in grooves 172 and 173 defined in the inner walls 127 and 129 of the wall members 122 and 124, respectively, as shown in FIGS. 4 and 5. The draft plate 146 must be sufficiently flexible to bend in an arc approximating the periphery of the water wheel 110. The flexible draft plate 146 is preferably made of aluminum, plastic, steel or any other sufficiently resilient material that is capable of being repeatedly bent and stressed. The draft plate 146 includes an upstream end 147a and a downstream end 147b. The draft plate 146 is attached at the upstream end 147a to the penstock plate 144 by a pair of hinges 160 and 161. The hinges 160 and 161 are secured to the penstock plate 144 and the draft plate 146 in any suitable manner, such as spot welds, rivets, bolts or the like. By virtue of such attachment, it is to be understood that movement of the penstock plate 144 induces correlative movement of the flexible draft plate 146. The flexible draft plate 146 extends below and, in certain configurations, to the upstream side of the water wheel 110. When the water wheel 110 is in a breast mode of operation, water 18 flows off the end of the penstock plate 144, engages and rotates the water wheel 110, and lands on the flexible draft plate 146.

The draft plate 146 may be fitted with additional supports (not shown) along its underside to strengthen and to prevent buckling of the draft plate 146. Such supports may be made of wood, metal or rubber. If utilized, the supports are secured to the bottom of the draft plate 146 in such a manner as not to interfere with movement of the plate within the grooves 172 and 173 in the wall members 122 and 124, respectively.

The downstream end 147b of the draft plate 146 is secured to the outlet plate 148. The outlet plate 148 may be made of any suitable material, such as water-treated wood, fiberglass, plastic or any type of metal of sufficient strength and durability to withstand the force of the flowing water. The outlet plate 148 facilitates delivery of water 18 from the draft plate 146 to the river or stream or other flowing body of water 18. The outlet plate 148 is secured to the draft plate 146 by a hinge 170. The hinge 170 is attached to both the draft plate 146 and the outlet plate 148 in any suitable manner, such as by spot welds, rivets, bolts or the like.

Figure 6:
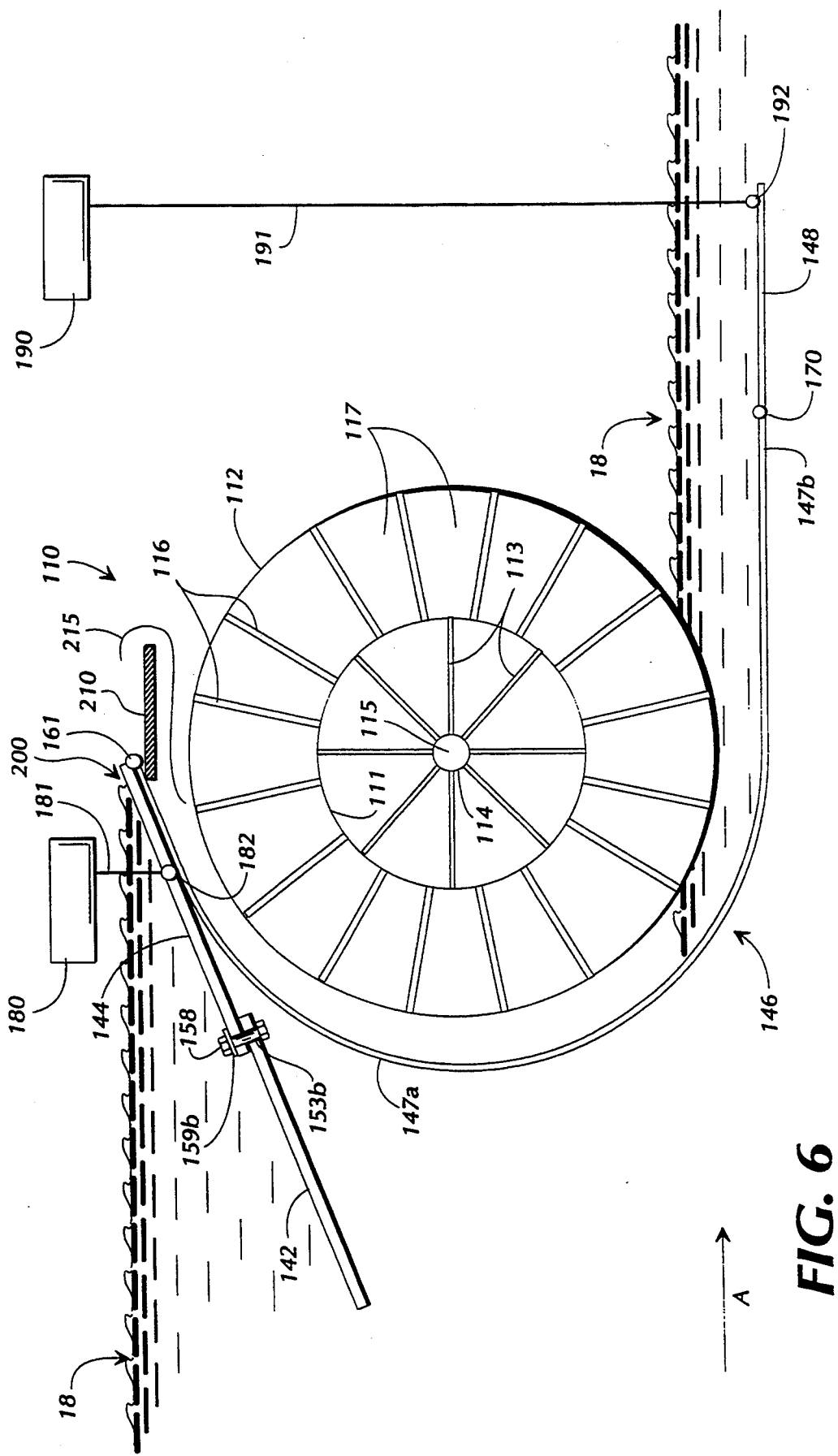
FIG. 6 is a cross-sectional schematic view showing a disclosed embodiment of the water wheel of the present invention in an overshot mode of operation.
Figure 7:
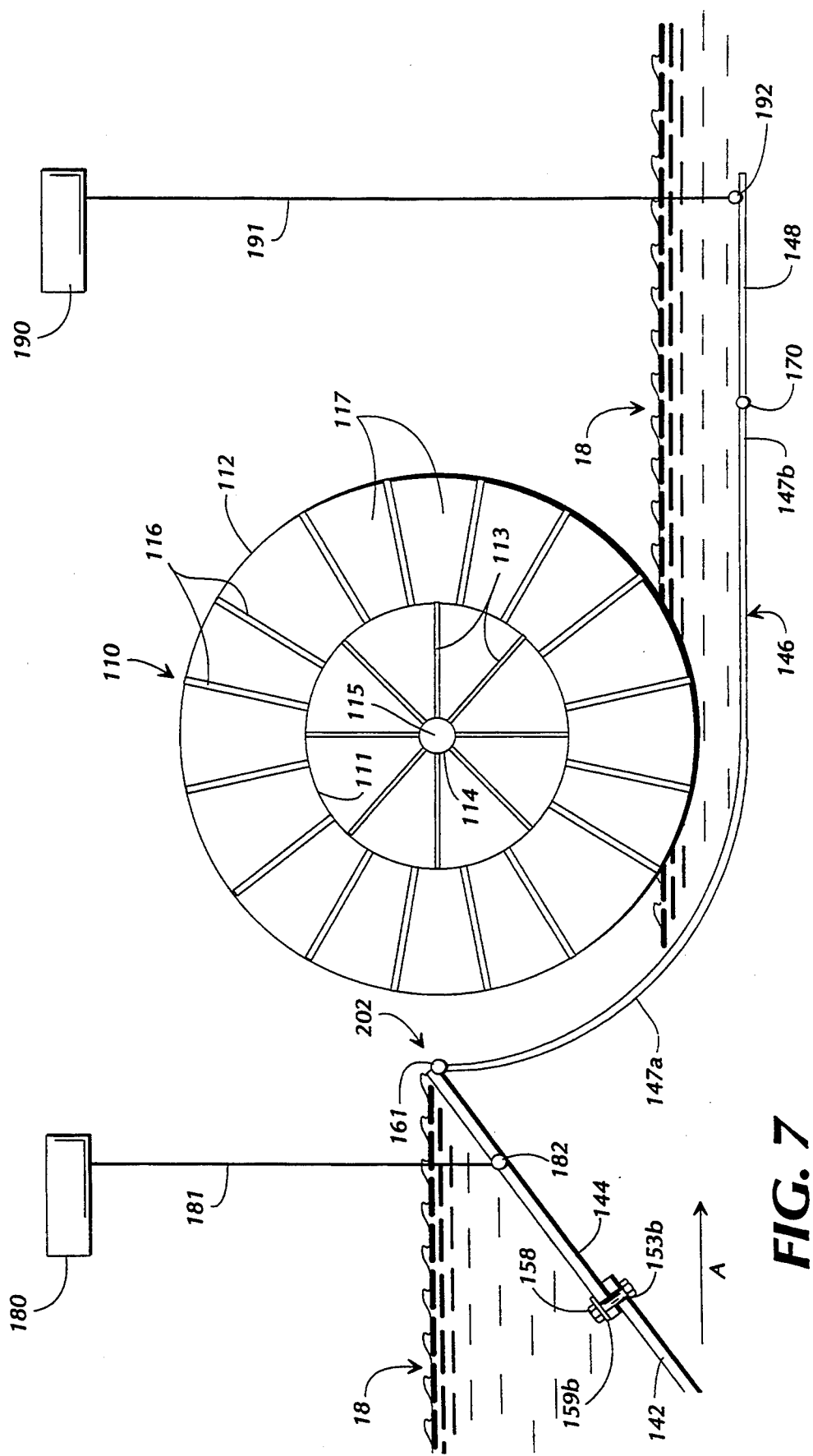
FIG. 7 is a cross-sectional schematic view showing a disclosed embodiment of the water wheel of the present invention in a breast mode of operation.
Figure 8:
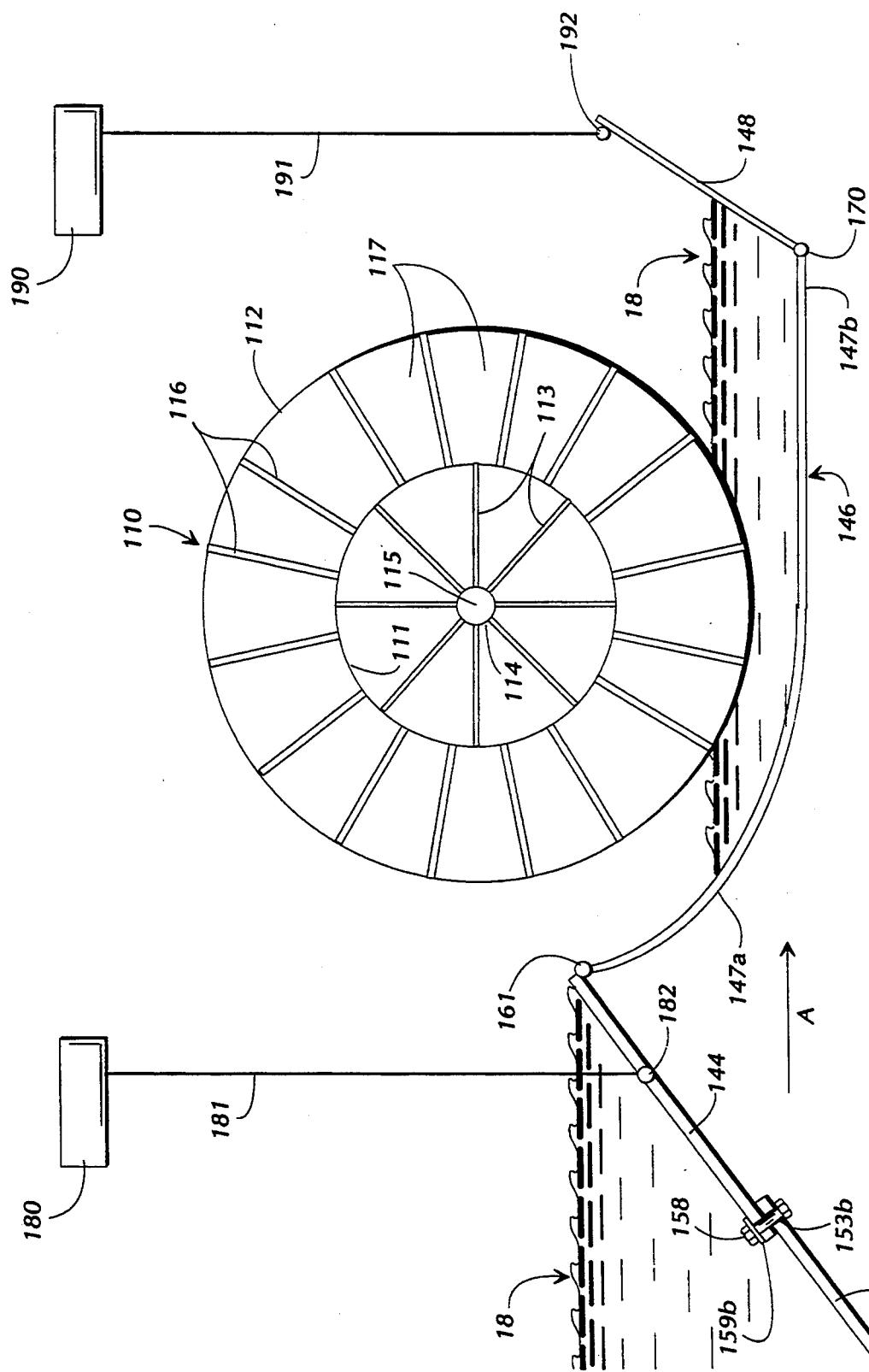
FIG. 8 is a cross-sectional schematic view showing a disclosed embodiment of the water wheel of the present invention in a breast mode of operation, with the outlet plate raised so as to effect a change in water flow downstream.
Figure 9:
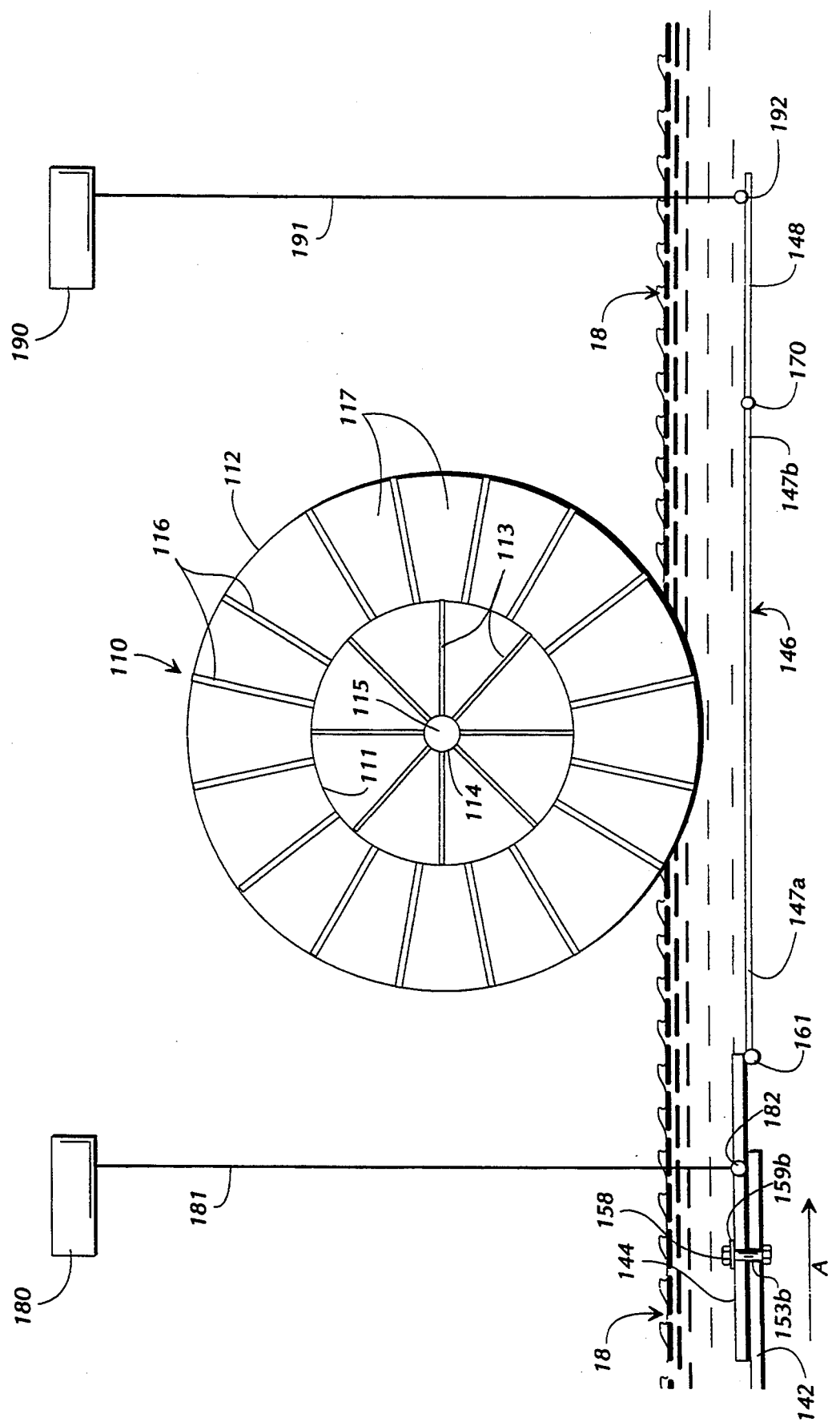
FIG. 9 is a cross-sectional schematic view showing a disclosed embodiment of the water wheel of the present invention in an undershot mode of operation.

Referring to FIGS. 6–9, it is seen that the dam floor 140 is adjustable. In FIG. 6, the inlet plate 142 and the penstock plate 144 have been raised to an angle of approximately 40° relative to the bed of the flowing body of water 18. These plates 142 and 144 are raised by means of a winch 180 and a rope 181 associated therewith. One end of the rope 181 is secured to the winch 180. The other end of the rope 181 is attached to a hook 182 secured to the top side of the penstock plate 144. Operation of the winch 180 raises or lowers the penstock plate 144. Because the penstock plate 144 is secured to the inlet plate 142, both plates 142 and 144 are raised as shown. Because the penstock plate 144 is also secured to the draft plate 146, the upstream end 147a of the draft plate 146 may be raised to a position near or above the level of the water wheel axle 115. When the winch 180 is operated to lower the penstock plate 144 and the inlet plate 142, the penstock plate 144 and the draft plate 146 are placed in a substantially horizontal position as shown in FIG. 9.

Another winch 190 is provided near the downstream end of the dam 100. The winch 190 includes a rope 191. The rope 191 is attached at one end to the winch 190. The other end of the rope 191 is attached to a hook 192 secured to the downstream end of the outlet plate 148. Operation of the winch 190 pivotably raises or lowers the outlet plate 148 for reasons set forth in detail below.

The movable and adjustable dam 100 of the present invention may either be transported by land to a location in a body of water as a whole or in separate, disassembled component parts, or it may be floated upstream or downstream as a whole or in separate unassembled parts. If transported unassembled, individual components of the invention are assembled once the location is reached where the dam 100 is to be operated. The wall members 122 and 124 are placed in the water. As viewed from the upstream direction in FIG. 5, the right side of the draft plate 146 is inserted into the groove 173 in the wall member 124. The axle 115 is inserted through the water wheel hub 114. The right end of the axle 115 of the water wheel 110 is then inserted into the axle bearing 175. Wall member 122 is then moved inwardly to receive the left side of the draft plate 146 in groove 172 and the left end of the axle 115 in the axle bearing 174, thus effectively securing the wheel 110 and the draft plate 146 between the wall members 122 and 124.

The outlet plate 148 is next connected to the downstream end of the draft plate 146 by fastening the outlet plate to hinge 170. The penstock plate 144 is connected to the upstream end of the draft plate 146. The inlet plate 142 is connected to the penstock plate 144 by use of bolts 157 and 158 and cooperating nuts 159a and 159b, or other suitable retaining devices, allowing the plates to be slidably connected. Winches 180 and 190 are then bolted to the wall members 122 and 124, thus providing structural support to the dam 100 and securing the wall members in spaced relationship. It will be appreciated that further bracing means may also be used to connect the wall members 122 and 124 in spaced relationship and to add structural stability to the dam 100.

As shown in FIG. 2, a generator 178 is bolted to the wall member 124. A mechanical linkage, such as a chain drive or any other type of linkage well known to those skilled in the art, is shown generally at 200. This linkage is connected at one end to a gear or pulley (not shown) associated with the axle 115 and at its other end to a mating gear (not shown) associated with the rotatable shaft 179 of the generator. The flowing body of water 18 causes the water wheel 110 to rotate. The axle 115 subsequently rotates and provides mechanical power to the mechanical linkage 200, thus causing the shaft 179 of the generator 178 to rotate. The generator converts the mechanical power, supplied to it through the mechanical linkage 200, to electrical power. However, it is to be appreciated that the water wheel 110 can also be adapted to supply power to power plants other than the generator 178, such as irrigation pumps, hydraulic drives or other various industrial or farm machinery.

Once the component parts are connected to the wall members 122 and 124, as described above, the wall members 122 and 124 are secured in place in the flowing body of water. Alternatively, the wall members 122 and 124 may be secured in place prior to connection of the component parts or during any point in the assembly of the component parts. The wall members 122 and 124 are secured in position in one of three ways. First, the wall covers 134a, 134b, 136a and 136b can be removed and the hollow wall members 122 and 124 may be filled with weighted objects, such as rock, metal weights, water or any other weighted objects or material capable of being inserted and removed. The weighted objects anchor the dam 100 in place. Second, long rods or posts may be inserted through the guides 138 and driven into the bed of the flowing body of water to anchor the wall members 122 and 124 in place. Third, the wall members 122 and 124 may be secured to trees, large rocks, posts, or other objects firmly attached to the ground on the banks of the flowing body of water by connecting the bits or cleats 139 on the wall members 122 and 124 to these objects with rope, cable, chain, or any other means suitable for such a connection. Any of these three methods can individually or in combination be used to secure the wall members 122 and 124 and thus the dam 100 in a stationary position at varying depths in the water.

As shown in FIG. 3, the wall members 122 and 124 are positioned so that the outer sides 123 and 125 rest against the banks of the flowing body of water so that water, flowing in the direction indicated by arrow A, is directed into the channel 125 defined by the inner sides 127 and 129. It is assumed that the banks of the body of water are substantially perpendicular with respect to the bottom of the body of water so that, when the outer sides 123 and 125 of the wall members 122 and 124 are positioned against the banks of the body of water, the flowing water is effectively blocked from flowing between the outer sides of the wall members and the banks. However, as will often be the case, the banks will not be substantially perpendicular with respect to the bottom of the body of water. Thus, excavation may be needed to assure that the outer sides of the wall members fit against the banks of the flowing body of water to effectively block the flow of water between the wall members 122 and 124 and the banks of the body of water.

The bottoms 137 and 141 of the respective wall members 122 and 124 also preferably rest upon the bed of the flowing body of water 18. If the bed is particularly rocky or sandy, a mat (not shown) composed of wood, steel, plastic or fiberglass may be positioned on the bed between the dam and the bed to prevent wear on or breakage of the wall members 122 and 124. By positioning the wall members 122 and 124 in the aforementioned manner, the respective inlet beveled walls 126 and 128 effectively direct the flowing body of water into the channel defined by the respective inner sides 127 and 129. As water from the channel flows into contact with the flanges 116 of the water wheel 110, the flowing water drives the water wheel 110 by rotating it in a manner dependent upon the water wheel mode of operation as depicted in FIGS. 6–9, and as will be described now in detail.

FIG. 6 shows the position of the plates 142, 144, 146, and 148 in relation to one another and the wheel 110 after the winch 180 has positioned the plates in the overshot mode of operation. The upstream end 147a of the draft plate 146 is moved upwardly by winch 180 to effectively block the flow of water in the channel defined by inner sides 127 and 129. Upstream, the dam builds the water to a height less than that necessary to overflow the banks of the flowing body of water. As the draft plate 146 is moved upwardly through upwardly-curved grooves 172 and 173, the downstream end 147b slidably adjusts in grooves 172 and 173 to a position underneath the water wheel 110 to compensate for the upward movement of the upstream end 147a of the draft plate 146. The upstream end 147a of the draft plate 146 and the penstock plate 144 combine to dam the water 18 in the water channel, causing the water to reach a head 200 before the water flows over the penstock plate 144 and over the top of the water wheel 110. Alternatively, water flowing over the penstock plate 144 may be redirected onto the water wheel so that the water wheel rotates in a counterclockwise direction as with the breast and undershot modes described below. The water may be redirected by implementing the combination of a water chute 210 and a baffle 215 mounted between the tops of the wall members 122 and 124, or through any other means capable of redirecting the water in such a manner.

As the winch 180 raises the penstock plate 144, the inlet plate 142 adjusts so that it slides down into contact with the bed of the flowing body of water 18. The inlet plate 142 and the penstock plate 144 in this position direct the water 18 into the channel 125 and toward the water wheel 110. The sliding of the inlet plate 142 relative to the penstock plate 144, in combination with the curvature of the grooves 172 and 173, allows the draft plate 146 and the penstock plate 144 to always remain free of the flanges 116 on the outer periphery of the water wheel 110, thus preventing any possible source of interference with the rotation of the water wheel 110 by the plates 144 and 146. This overshot water wheel mode of operation is most efficient when the flow, or velocity, of the water is low or when water quantity is low, because the overshot mode significantly increases the head of the water. Thus, the water level increases behind the penstock plate 144 and possesses a significant amount of potential energy by the time the water reaches the height of the head 200 (see FIG. 6). The potential energy converts to kinetic energy as the water 18 flows over the water wheel 110.

FIG. 7 illustrates the relative positions of the plates 142, 144, 146, and 148 after the winch 180 has adjusted the dam 100 to the breast mode of operation. The inlet plate 142 and the penstock plate 144 adjust accordingly, with the penstock plate 144 remaining an equal distance away from the water wheel 110. The inlet plate 142 and the penstock plate 144 adjust to an angle more acute relative to the bed of the flowing body of water 18. Water 18 in the channel is dammed until it reaches a head 202, at which time the water flows over the penstock plate 144 and into contact with the flanges 116 of the water wheel 110. The water 18 drives the water wheel 110 as it flows into contact with the flanges 116 of the water wheel. The water 18 then flows out over draft plate 146, over the outlet plate 148 and back into the flowing body of water. This mode of operation is most effective, as with the overshot mode, when water flow or water quantity is low. The head 202, and thus the potential energy, of the water 18 is increased. This potential energy is converted into kinetic energy as the force of gravity causes the water to flow into contact with the water wheel 110 in a breast mode of operation.

FIG. 8 illustrates the relative positioning of the plates 142, 144, 146, and 148 after the outlet plate 148 is adjusted by the winch 190 to aid the winch 180 in adjusting the plates 142, 144, 146, and 148 from a breast position to an undershot position. As the winch 190 raises the outlet plate 148 upwardly, the water flowing out of the water channel 125 past outlet beveled walls 130 and 132 is impeded. The flowing water exerts pressure against the face of the outlet plate 148. Simultaneously with the winch 190 raising the outlet plate 148, the winch 180 lowers the penstock plate 144 and, correspondingly, the draft plate 146. The pressure exerted against the face of the outlet plate 148 causes the draft plate 146 to slide in a downstream direction in grooves 172 and 173. As the rope 181 becomes less taut, the pressure exerted by the flowing water 18 against the face of the outlet plate 148 thus causes the inlet plate 142 and the penstock plate 144 to adjust from a position of overshot or breast mode of operation to a position of an undershot mode of operation. The downstream configuration of winch 190, rope 191, hook 192, outlet plate 148 and hinge 170 thus allows one to easily effect a smooth transition from either an overshot mode of operation or a breast mode of operation to an undershot mode of operation with minimal physical and mechanical difficulty, particularly when winches 180 and 190 are hand operated.

FIG. 9 illustrates the relative positions of the plates 142, 144, 146, and 148 after the winch 180 lowers the penstock plate 144 and the inlet plate 142 to a horizontal position below water level. The draft plate 146 is subsequently lowered, allowing the dam to function in an undershot mode of operation. In this position, all plates 142, 144, 146 and 148 of the adjustable floor 140 lie in substantially horizontal position just underneath the surface of the water to allow the water to freely flow through the channel defined by the inner sides 127 and 129, thus driving the wheel 110, and thereafter flowing out of the channel 125 past the outlet beveled walls 130 and 132 over outlet plate 148. It will be appreciated that the inlet plate 142 and the penstock plate 144 may be angled slightly above the horizontal to incrementally build up the head of the water before it flows into contact with the water wheel 110. Additionally, the wall members 122 and 124 may be lowered further into the water, if the wall members are not already resting on the bed of the flowing body of water, to allow the flowing water to more effectively engage the water wheel 10 during sustained wet periods or during other periods of increased water quantity flow or level. This mode of operation is most effective when the water flow, and thus the velocity, is high or when the quantity of water available is high. When quantity or flow is high, the water can drive the water wheel 110 by rotating it without the need to build up the head of the water as shown in FIGS. 6 and 7.

It will be appreciated that the foregoing represents a significant improvement over prior small scale power-generating dams. The present invention provides a dam 100 with a power-generating water wheel 110 that provides an enhanced ability for generating power in a manner more efficient than prior art small scale power-generating dams. The present invention generates power from a flowing body of water and is flexibly designed to maximize power-generating efficiency in accordance with changing water conditions. Moreover, the movable and adjustable dam of the present invention is easily disassembled for transportation by land to a different flowing body of water or for transportation up or down the flowing body of water to a different location. Further, the present invention is relatively lightweight for ease of relocation.

While a single movable and adjustable dam has been described in conjunction with the preferred embodiment of the present invention, it should be understood that several movable and adjustable dams may similarly be implemented in series across a flowing body of water to generate power. In such an arrangement, adjacent wall members of adjacent dams are connected so as to effectively block flowing water and to direct the flowing water into the respective channels of each individual movable and adjustable dam. The outermost wall members of the two outermost dam assemblies are placed against the respective banks of the flowing body of water in the aforementioned manner. As the water is directed into and flows through the dam assembly channels, it rotates the water wheels located in the respective channels in the aforementioned manner. This alternative embodiment of the movable and adjustable dam of the present invention is identical in all other aspects to the aforementioned preferred embodiment.

From the foregoing description of the preferred embodiment of the present invention, other embodiments of the present invention will suggest themselves to those skilled in the art. Particular details of the preferred embodiment are included to fully disclose the best mode of the invention contemplated by the inventor. These details should not be taken to limit the scope of the present invention. The scope of the invention is to be limited only by the claims below and the equivalents thereof.

What is claimed is:

1. A movable and adjustable dam for generating power in a flowing body of water, comprising:
   two wall members spaced from each other so as to define a channel there between;
   a water wheel rotatably mounted between said wall members operative to be driven by flowing water in said channel; and
   an adjustable dam floor between said wall members whereby adjustment of said dam floor in a vertical direction controls the level of water in said channel to thereby maximize the power-generating efficiency of said water wheel.

2. The movable and adjustable dam of claim 1, wherein said adjustable dam floor comprises:
   a draft plate slidably mounted between said wall members to effect said adjustment of said dam floor in said vertical direction; and
   a penstock plate operatively connected to said draft plate such that adjustment of said penstock plate affects said correlative adjustment of said dam floor in said vertical direction.

3. The movable and adjustable dam of claim 2, wherein said dam floor comprises an inlet plate, said inlet plate being slidably mounted to said penstock plate to direct water into said channel and toward said water wheel.

4. The movable and adjustable dam of claim 2, wherein said dam floor comprises an outlet plate operatively connected to said draft plate to effect adjustment of said draft and penstock plates in said vertical direction.

5. The movable and adjustable dam of claim 2, further comprising a first winch operatively connected to said penstock plate to effect adjustment of said draft and penstock plates in said vertical direction.

6. The movable and adjustable dam of claim 5, further comprising a second winch operatively connected to said outlet plate to effect adjustment of said draft and penstock plates in said vertical direction.

7. The movable and adjustable dam of claim 6, wherein said penstock plate is adjustable from a first predetermined position to a second predetermined position in said vertical direction, whereby the dam is adjustable to function in an undershot mode of operation when said penstock plate is in said first predetermined position and in an overshot mode of operation when said penstock plate is in said second predetermined position.

8. The movable and adjustable dam of claim 7, wherein said penstock plate is adjustable to a third predetermined position to function in a breast mode of operation.

9. The movable and adjustable dam of claim 1, wherein said wall members are hollow.

10. The movable and adjustable dam of claim 9, further comprising weights within said wall members to secure said wall members in a fixed position.

11. The movable and adjustable dam of claim 1, further comprising fastening members attached to said wall members to secure said movable and adjustable dam to objects on land adjacent to a flowing body of water.

12. The movable and adjustable dam of claim 1, wherein said water wheel has a flanged outer periphery to effectively engage said flowing water.

13. The movable and adjustable dam of claim 1, further comprising a generator operatively connected to said water wheel such that rotation of said water wheel rotates a rotor shaft of said generator, thereby generating electricity.

14. A movable and adjustable dam for generating power, comprising:
   two wall members spaced apart from each other so as to form a channel there between;
   a water wheel rotatably mounted between said wall members to be driven by flowing water in said channel; and
   an adjustable dam floor between said wall members, comprising;
   a draft plate slidably mounted between said wall members;
   a penstock plate operatively connected to said draft plate;
   an inlet plate slidably mounted to said penstock plate;
   an outlet plate operatively connected to said draft plate;
   whereby adjustment of said penstock plate effects correlative adjustment of said draft plate so as to convert operational modes of the dam to maximize power-generating capacity of said water wheel.

15. The movable and adjustable dam of claim 14, further comprising a generator operatively connected to said water wheel to generate power from rotation of said water wheel by said flowing water.

16. The movable and adjustable dam of claim 14, further comprising a first winch operatively connected to said penstock plate to effect adjustment of said draft and penstock plates in a vertical direction.

17. The movable and adjustable dam of claim 16, further comprising a second winch operatively connected to said outlet plate to effect adjustment of said draft and penstock plates in a vertical direction.

18. The movable and adjustable dam of claim 17, wherein said penstock plate is adjustable from a first predetermined position to a second predetermined position in said vertical direction, whereby the dam is adjustable to function in an undershot mode of operation when said penstock plate is in said first predetermined position and in an overshot mode of operation when said penstock plate is in said second predetermined position.

19. The movable and adjustable dam of claim 18, wherein said penstock plate is adjustable to a third predetermined position to function in a breast mode of operation.

20. The movable and adjustable dam of claim 14, wherein said wall members are hollow.

21. The movable and adjustable dam of claim 20, further comprising weights within said wall members to secure said wall members in a fixed position.

22. The movable and adjustable dam of claim 14, further comprising fastening members attached to said wall members to secure said movable and adjustable dam to objects on land adjacent to said flowing water.

23. The movable and adjustable dam of claim 14, wherein said water wheel has a flanged outer periphery to effectively engage said flowing water in said channel.

24. The movable and adjustable dam of claim 14, wherein each of said wall members comprises an outer wall, a deflection upstream wall, an inner wall and a downstream beveled wall.

25. The movable and adjustable dam of claim 24, wherein each of said inner walls defines a groove in which said draft plate is slidably mounted.

26. A method for providing an adjustable dam, comprising the steps of:
   providing two wall members spaced apart from each other, each having an inner side, an outer side, an inlet edge and an outlet edge;
   providing an adjustable dam floor secured between said wall members;
   providing a water wheel rotatably mounted between said wall members;
   placing said wall members between banks of a flowing body of water to effectively secure said wall members in a watertight fit between said outer sides of said wall members and said banks of said flowing body of water and to form a channel between said inner sides;

directing said flowing body of water past said inlet edges, into said channel, and over said adjustable dam floor to rotate said water wheel before said flowing body of water exits through said outlet edges; and adjusting said dam floor to a desired height, said height of said dam floor controlling the water level upstream from said water wheel and thus controlling the operational modes of said water wheel.

27. The method of claim 26, further comprising the step of generating power from rotation of said water wheel.

28. A method of adjustably damming a flowing body of water, comprising the steps of:

positioning in said flowing body of water two wall members spaced apart from each other to thereby define a channel there between, said wall members having an adjustable dam floor and a water wheel disposed there between, said dam floor being adjustable in a vertical direction from a first position to a second position to selectively block a portion of said channel, said water wheel being operative to be rotated by water flowing through said channel; and adjusting said dam floor from said first position to said second position so as to selectively adjust the height of the water dammed by said dam floor to a desired height, thereby adjustably converting said water wheel from one mode of operation to another mode of operation, said modes of operation being selected from the group consisting of undershot mode, breast mode and overshot mode.

* * * * *